(12) United States Patent
Su

(10) Patent No.: US 12,079,485 B2
(45) Date of Patent: Sep. 3, 2024

(54) METHOD AND APPARATUS FOR CLOSING OPEN BLOCK IN SSD

(71) Applicant: INSPUR SUZHOU INTELLIGENT TECHNOLOGY CO., LTD., Jiangsu (CN)

(72) Inventor: Jun Su, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/246,475

(22) PCT Filed: Sep. 28, 2021

(86) PCT No.: PCT/CN2021/121431
§ 371 (c)(1),
(2) Date: Mar. 23, 2023

(87) PCT Pub. No.: WO2022/111041
PCT Pub. Date: Jun. 2, 2022

(65) Prior Publication Data
US 2023/0359363 A1 Nov. 9, 2023

(30) Foreign Application Priority Data
Nov. 27, 2020 (CN) .......................... 202011352408.7

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC .... G06F 3/0613; G06F 3/0659; G06F 3/0679; G06F 3/0619; G06F 3/0611; G06F 3/064;
(Continued)

(56) References Cited

U.S. PATENT DOCUMENTS

2012/0246391 A1 9/2012 Meir et al.
2014/0059406 A1* 2/2014 Hyun .................. G11C 11/5642
714/773
(Continued)

FOREIGN PATENT DOCUMENTS

CN 107450858 A 12/2017
CN 108762670 A 11/2018
(Continued)

OTHER PUBLICATIONS

Search report for PCT/CN2021/121431 mailed on Jan. 6, 2022.
Search report for Chinese application 202011352408.7, filed Nov. 27, 2020.

*Primary Examiner* — Michelle T Bechtold
*Assistant Examiner* — Tong B. Vo
(74) *Attorney, Agent, or Firm* — Dennemeyer & Associates LLC; Victoria Friedman

(57) ABSTRACT

Provided are a method and an apparatus for writing data into an SSD. The method includes: configuring, in the SSD, a low-level cell for storing open block data to form a low-level cell block; in response to receiving a data write instruction, writing data into a high-level cell of the SSD, the high-level cell has a unit capacity higher than that of the low-level cell; in response to that an existing time of a block that is not full of data in the high-level cell exceeds an open block status threshold value, determining the block that is not full of data as an open block and storing the open block in pending list; and in response to the existence of the open block in the pending list, transferring the open block to the low-level cell block through an internal memory, and closing the open block in the low-level cell block.

18 Claims, 1 Drawing Sheet

(58) Field of Classification Search
CPC ...... G06F 3/068; G06F 3/0604; G06F 3/0622; Y02D 10/00
See application file for complete search history.

(56) References Cited

U.S. PATENT DOCUMENTS

| | | | |
|---|---|---|---|
| 2015/0193302 A1* | 7/2015 | Hyun | G11C 29/028 |
| | | | 714/764 |
| 2019/0034114 A1* | 1/2019 | Natarajan | G06F 3/0685 |
| 2019/0235789 A1* | 8/2019 | Yan | G06F 3/0656 |
| 2020/0042223 A1 | 2/2020 | Li | |
| 2021/0223962 A1* | 7/2021 | Esaka | G06F 3/0688 |
| 2021/0263674 A1* | 8/2021 | Shin | G11C 11/5628 |
| 2021/0318833 A1* | 10/2021 | Parker | G06F 3/0659 |
| 2021/0365202 A1* | 11/2021 | Shin | G06F 3/0679 |
| 2022/0075551 A1* | 3/2022 | Alhussien | G06F 3/0649 |

FOREIGN PATENT DOCUMENTS

| | | |
|---|---|---|
| CN | 110673789 A | 1/2020 |
| CN | 112463053 A | 3/2021 |
| WO | 2015109128 A1 | 7/2015 |

* cited by examiner

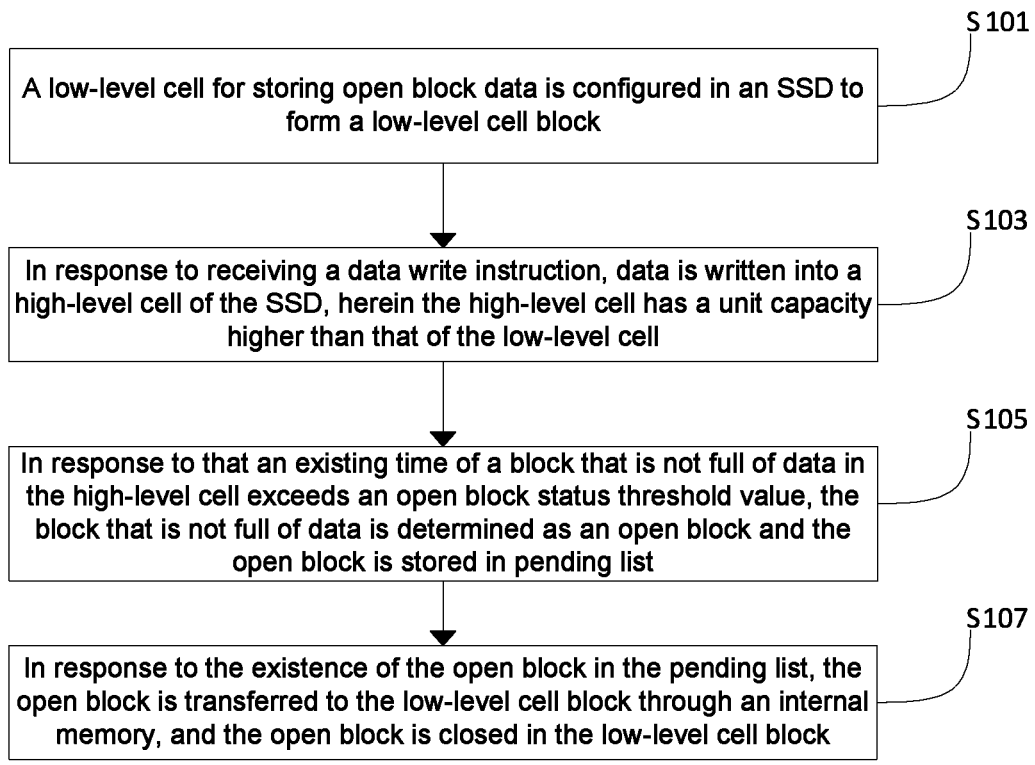

METHOD AND APPARATUS FOR CLOSING OPEN BLOCK IN SSD

CROSS-REFERENCE TO RELATED APPLICATIONS

This is a 35 U.S.C. 371 National Stage Patent Application of International Application No. PCT/CN2021/121431, filed Sep. 28, 2021, which claims priority to Chinese application 202011352408.7, filed Nov. 27, 2020, each of which is hereby incorporated by reference in its entirety.

TECHNICAL FIELD

The present disclosure relates to the field of storage, more particularly, to a method and an apparatus for writing data into a Solid State Drive (SSD).

BACKGROUND

With the development and wide application of technologies such as the Internet, cloud computing, and the Internet of Things, massive data is generated and needs to be processed and stored all the time in human life. The rapid development of an information technology has put forward higher requirements for the performance of a storage system. An SSD is widely used due to its high reading and writing speed and low energy consumption. However, due to characteristics of a NAND, it is affected by electrical characteristics of hardware, that is, when a block in the NAND is not full, after a certain time, the data written into the block finally will become unstable. We call this phenomenon an open block phenomenon. Here, there is a high probability of error correction failures of the data.

At present, a common method is to correct an error by using a read retry error correction table when an error appears again, or part invalid data is written again, which ensures that previous invalid data is no longer located at the last position, and avoids the open block phenomenon. The above processing method does not have a great impact on the processing of a NAND flash of a low-level cell. However, for a high-level cell, the writing time will increase significantly, and the issuing of normal data will be affected, so there is a great impact on performance and power-off time of the SSD.

There is no effective solution for the problem that the data writing time for processing an open block in the SSD in a related art is too long at present.

SUMMARY

In view of this, an objective of embodiments of the present disclosure is to provide a method and an apparatus for writing data into an SSD, which can reduce the impact of writing invalid data on performance.

Based on the above objective, a first aspect of the embodiments of the present disclosure provides a method for writing data into an SSD, which includes performing the following steps.

A low-level cell for storing open block data is configured in an SSD to form a low-level cell block.

In response to receiving a data write instruction, data is written into a high-level cell of the SSD. The high-level cell has a unit capacity higher than that of the low-level cell.

In response to that an existing time of a block that is not full of data in the high-level cell exceeds an open block status threshold value, the block that is not full of data is determined as an open block and the open block is stored in pending list.

In response to the existence of the open block in the pending list, the open block is transferred to the low-level cell block through an internal memory, and the open block is closed in the low-level cell block.

In some implementations, the low-level cell is a Single-Level Cell (SLC) or a Multi-Level Cell (MLC); the high-level cell is a Trinary-Level Cell (TLC) or a Quad-Level Cell (QLC); and the data writing speed of the low-level cell is higher than that of the high-level cell.

In some implementations, the low-level cell block includes a master block and a standby block. The step that the open block is transferred to the low-level cell block through the internal memory includes the following operations.

In response to that the master block is not full, the open block is transferred to the master block through the internal memory.

In response to that the master block is full, the open block is transferred to the standby block through the internal memory.

In some implementations, the method further includes that: in response to that the master block and the standby block are full, the open block that has been closed in the master block or the standby block is transferred into a block in the high-level cell.

In some implementations, the method further includes that: after the open block is transferred to the low-level cell block through the internal memory, a mapping table recording data storage addresses is adaptively updated.

In some implementations, the method further includes that: after the open block is transferred to the low-level cell block through the internal memory, the open block status threshold value is increased.

In some implementations, the operation that the open block is closed includes that: a read retry table is generated and stored for the open block, or invalid data is written into a part, which is not full of data, in the open block.

A second aspect of the embodiments of the present disclosure provides an apparatus for writing data into an SSD, which includes a processor and a memory.

The memory stores processor-executable program code, the following steps are performed when the processor-executable program code is running.

A low-level cell for storing open block data is configured in an SSD to form a low-level cell block.

In response to receiving a data write instruction, data is written into a high-level cell of the SSD. The high-level cell has a unit capacity higher than that of the low-level cell.

In response to that an existing time of a block that is not full of data in the high-level cell exceeds an open block status threshold value, the block that is not full of data is determined as an open block and the open block is stored in pending list.

In response to the existence of the open block in the pending list, the open block is transferred to the low-level cell block through an internal memory, and the open block is closed in the low-level cell block.

In some implementations, the low-level cell is a Single-Level Cell (SLC) or a Multi-Level Cell (MLC); the high-level cell is a Trinary-Level Cell (TLC) or a Quad-Level Cell (QLC); and the data writing speed of the low-level cell is higher than that of the high-level cell.

In some implementations, the low-level cell includes a master block and a standby block.

The step that the open block is transferred to the low-level cell block through the internal memory includes that: in response to that the master block is not full, the open block is transferred to the master block through the internal memory; and in response to that the master block is full, the open block is transferred to the standby block through the internal memory.

In response to that the master block and the standby block are full, the open block that has been closed in the master block or the standby block is transferred into a block in the high-level cell.

The present disclosure has the following beneficial effects: by applying the method and the apparatus for writing data into an SSD provided by the embodiments of the present disclosure, the impact of writing invalid data on performance can be reduced through the following technical solution: a low-level cell for storing open block data is configured in the SSD to form a low-level cell block; in response to receiving a data write instruction, data is written into a high-level cell of the SSD, herein the high-level cell has a unit capacity higher than that of the low-level cell; in response to that an existing time of a block that is not full of data in the high-level cell exceeds an open block status threshold value, a block that is not full of data is determined as an open block and storing the open block in pending list; and in response to the existence of the open block in the pending list, the open block is transferred to the low-level cell block through an internal memory, and the open block is closed in the low-level cell block.

BRIEF DESCRIPTION OF THE DRAWINGS

In order to illustrate the embodiments of the present disclosure or the technical solutions in the conventional art more clearly, the drawings used in the description of the embodiments or the conventional art will be briefly described below. It is apparent that the drawings in the following description are only some embodiments of the present disclosure, and other drawings can be obtained by those skilled in the art according to these drawings without any creative work.

FIG. 1 illustrates a schematic flowchart of a method for writing data into an SSD provided by the present disclosure.

DETAILED DESCRIPTION OF THE EMBODIMENTS

In order to make the purposes, technical solutions, and advantages of the present disclosure clearer, the embodiments of the present disclosure will be further described in detail below with reference to specific embodiments and the drawings.

It is to be noted that, all expressions using "first" and "second" in the embodiments of the present disclosure are for the purpose of distinguishing two non-identical entities with the same name or non-identical parameters. It may be seen that "first" and "second" are only for the convenience of expression, and should not be construed as a limitation to the embodiments of the present disclosure, which are not described one by one thereto in the subsequent embodiments.

Based on the above objective, a first aspect of the embodiments of the present disclosure provides an embodiment of a method for writing data into an SSD which can reduce the impact of writing invalid data on performance. FIG. 1 illustrates a schematic flowchart of a method for writing data into an SSD provided by the present disclosure.

The method for writing data into an SSD, as shown in FIG. 1, includes the following steps.

At S101, a low-level cell for storing open block data is configured in an SSD to form a low-level cell block.

At S103, in response to receiving a data write instruction, data is written into a high-level cell of the SSD. The high-level cell has a unit capacity higher than that of the low-level cell.

At S105, in response to that an existing time of a block that is not full of data in the high-level cell exceeds an open block status threshold value, the block that is not full of data is determined as an open block and the open block is stored in pending list.

At S107, in response to the existence of the open block in the pending list, the open block is transferred to the low-level cell block through an internal memory, and the open block is closed in the low-level cell block.

The present disclosure considers physical and electrical characteristics of an NAND, and uses the advantage of a great difference between writing time of an SLC and writing time of an QLC (the total writing time difference between the SLC and the QLC is more than 100 times) to transfer part data into the SLC. Thus, the impact of writing invalid data into the QLC on the performance is effectively reduced.

A person of ordinary skill in the art may understand that all or some of the processes of the above method embodiment may be implemented by a computer program instructing relevant hardware. The program may be stored in a computer-readable storage medium. When the program runs, the processes of each method embodiment mentioned above are performed. The storage medium may be a disk, an optical disk, a Read Only Storage Memory (ROM), or a Random Access Memory (RAM). The embodiment of the computer program may achieve the same or similar effects to any method embodiment corresponding thereto.

In some implementations, the low-level cell is an SLC or an MLC; the high-level cell is a TLC or a QLC; and the data writing speed of the low-level cell is much, for example, several orders of magnitude, higher than that of the high-level cell.

In some implementations, the low-level cell block includes a master block and a standby block. The step that the open block is transferred to the low-level cell block through the internal memory includes the following operations.

In response to that the master block is not full, the open block is transferred to the master block through the internal memory.

In response to that the master block is full, the open block is transferred to the standby block through the internal memory.

In some implementations, the method further includes that: in response to that the master block and the standby block are full, the open block that has been closed in the master block or the standby block is transferred into a block in the high-level cell.

In some implementations, the method further includes that: after the open block is transferred to the low-level cell block through the internal memory, a mapping table recording data storage addresses is adaptively updated.

In some implementations, the method further includes that: after the open block is transferred to the low-level cell block through the internal memory, the open block status threshold value is increased.

In some implementations, the operation that the open block is closed includes that: a read retry table is generated and stored for the open block, or invalid data is written into a part, which is not full of data, in the open block.

The following further describes specific implementations of the present disclosure according to specific embodiments.

1. A certain quantity of blocks are selected and are defined as SLC blocks, which are specially configured to store data transferred due to the open block in the QLC. The total quantity of the selected blocks is divided into two groups. One group is used, and the other group is used as standby. The two groups are used in turn.

2. Whether the blocks are in an open block state is determined.

1) A timer is set. Data retention time of the blocks that are not full is determined in sequence. The data storage time is a time difference value between a start of a block and a time point detected by the timer.

2) If the time difference value exceeds a threshold for determining an open block state, the block may be considered as an open block, and the newly detected open block is placed in a pending list.

3) If the time difference value does not exceed the threshold, no processing is needed, and the next turn of detecting is waited.

3. In a main loop function, the pending list that stores the open block is detected in real time. If there is open block information in the list, transferring of part data in the block is triggered.

1) Whether a target SLC block address to be subjected to data transferring is full is determined. If the target SLC block address to be subjected to data transferring is full, a standby SLC block is switched.

2) The last level of data written into the block is read to a Double Data Rate (DDR) in sequence.

3) The data in the DDR is written into a divided SLC block according to an SLC format. If the SLC is full, a standby block of the SLC needs to be switched.

4) After the data is written into the block of the SLC, a mapping table that stores data needs to be updated.

4. After data transferring is completed, a recycle level of the open block is appropriately raised, that is, when the SSD triggers recycle of the block, these blocks that are not full will be recovered first.

5. In order to improve the utilization of the SLC blocks, after one SLC BLOCK is filled with data, the SSD will transfer the data into other QLC blocks.

It can be seen from the above embodiment that, by applying the method for writing data into an SSD provided by the embodiments of the present disclosure, the impact of writing invalid data on performance can be reduced through the following technical solution: a low-level cell for storing open block data is configured in the SSD to form a low-level cell block; in response to receiving a data write instruction, data is written into a high-level cell of the SSD, herein the high-level cell has a unit capacity higher than that of the low-level cell; in response to that an existing time of a block that is not full of data in the high-level cell exceeds an open block status threshold value, a block that is not full of data is determined as an open block and storing the open block in a pending list; and in response to the existence of the open block in the pending list, the open block is transferred to the low-level cell block through an internal memory, and the open block is closed in the low-level cell block.

It is to be particularly noted that various steps in various embodiments of the method for writing data into an SSD may be crossed with, replaced with, added to, or deleted from each other, so that these rational permutation and combination transformations for the method for writing data into an SSD should also belong to the scope of protection of the present disclosure, and the scope of protection of the present disclosure should not be limited to the embodiments.

Based on the above objective, a second aspect of the embodiments of the present disclosure provides an embodiment of an apparatus for writing data into a solid state drive which can reduce the impact of writing invalid data on performance. An apparatus for writing data into an SSD includes a processor and a memory.

The memory stores processor-executable program code, the following steps are performed when the processor-executable program code is running.

A low-level cell for storing open block data is configured in the SSD to form a low-level cell block.

In response to receiving a data write instruction, the data is written into a high-level cell of the SSD. The high-level cell has a unit capacity higher than that of the low-level cell.

In response to that an existing time of a block that is not full of data in the high-level cell exceeds an open block status threshold value, the block that is not full of data is determined as an open block and the open block is stored in a pending list.

In response to the existence of the open block in the pending list, the open block is transferred to the low-level cell block through an internal memory, and the open block is closed in the low-level cell block.

In some implementations, the low-level cell is an SLC or an MLC; the high-level cell is a TLC or a QLC; and the data writing speed of the low-level cell is higher than that of the high-level cell.

In some implementations, the low-level cell includes a master block and a standby block.

The step that the open block is transferred to the low-level cell block through the internal memory includes that: in response to that the master block is not full, the open block is transferred to the master block through the internal memory; and in response to that the master block is full, the open block is transferred to the standby block through the internal memory.

In response to that the master block and the standby block are full, the open block that has been closed in the master block or the standby block is transferred into a block in the high-level cell.

It can be seen from the above embodiment that, by applying the apparatus for writing data into an SSD provided by the embodiments of the present disclosure, the impact of writing invalid data on performance can be reduced through the following technical solution: a low-level cell for storing open block data is configured in the SSD to form a low-level cell block; in response to receiving a data write instruction, data is written into a high-level cell of the SSD, herein the high-level cell has a unit capacity higher than that of the low-level cell; in response to that an existing time of a block that is not full of data in the high-level cell exceeds an open block status threshold value, a block that is not full of data is determined as an open block and storing the open block in a pending list; and in response to the existence of the open block in the pending list, the open block is transferred to the low-level cell block through an internal memory, and the open block is closed in the low-level cell block.

It is to be particularly noted that working processes of various modules in the embodiment of the above apparatus for writing data into an SSD are specifically described by using the embodiment of the method for writing data into an SSD. A person skilled in the art may easily figure out applying these modules to other embodiments of the method for writing data into an SSD. Of course, various steps in various embodiments of the method for writing data into an SSD may be crossed with, replaced with, added to, or deleted from each other, so that these rational permutation and combination transformations for the apparatus for writing data into an SSD should also belong to the scope of protection of the present disclosure, and the scope of protection of the present disclosure should not be limited to the embodiments.

The above are exemplary embodiments of the present disclosure, but it should be noted that, various changes and modifications may be made without departing from the scope disclosed in the embodiments of the present disclosure as defined in the claims. The functions, steps and/or actions of the method claims in accordance with the disclosed embodiments described herein need not be performed in any particular order. In addition, although elements disclosed in the embodiments of the present disclosure may be described or claimed in the singular, unless explicitly limited to the singular, the plural may also be construed.

Those of ordinary skill in the art should understand that, the discussion of any of the above embodiments is merely exemplary, and is not intended to imply that the scope (including the claims) disclosed in the embodiments of the present disclosure is limited to these examples. Under the idea of the embodiments of the present disclosure, the technical features in the above embodiments or different embodiments can also be combined. In addition, there are many other changes in different aspects of the above embodiments of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A method for writing data into a Solid State Drive (SSD), comprising:
    configuring, in the SSD, a low-level cell for storing open block data to form a low-level cell block;
    in response to receiving a data write instruction, writing data into a high-level cell of the SSD, wherein the high-level cell has a unit capacity higher than a unit capacity of the low-level cell;
    in response to that an existing time of a block which is not full of data in the high-level cell exceeds an open block status threshold value, determining the block that is not full of data as an open block and storing the open block in a pending list; and
    in response to the existence of the open block in the pending list, transferring the open block to the low-level cell block through an internal memory, and closing the open block in the low-level cell block, increasing the open block status threshold value after transferring the open block to the low-level cell block through the internal memory;
    wherein the low-level cell is a Single-Level Cell (SLC) or a Multi-Level Cell (MLC); the high-level cell is a Trinary-Level Cell (TLC) or a Quad-Level Cell (QLC); and a data writing speed of the low-level cell is higher than a data writing speed of the high-level cell.

2. The method according to claim 1, wherein the low-level cell block comprises a master block and a standby block; transferring the open block to the low-level cell block through an internal memory comprises:
    in response to that the master block is not full, transferring the open block to the master block through the internal memory; and
    in response to that the master block is full, transferring the open block to the standby block through the internal memory.

3. The method according to claim 2, further comprising:
    in response to that the master block and the standby block are full, transferring the open block that has been closed in the master block or in the standby block to the high-level cell.

4. The method according to claim 1, further comprising:
    adaptively updating a mapping table recording data storage addresses after transferring the open block to the low-level cell block through the internal memory.

5. The method according to claim 1, wherein the step of closing the open block comprises:
    generating and storing a read retry table for the open block, or writing invalid data into a part, which is not full of data, in the open block.

6. The method according to claim 1, further comprising:
    increasing the recycle level of the open block after transferring the open block to the low-level cell block through the internal memory.

7. The method according to claim 1, further comprising:
    setting a timer to detect whether the existing time of the block which is not full of data exceeds the open block status threshold value.

8. The method according to claim 1, wherein the existing time is a time difference value between a start of the block and a time point detected by the timer.

9. The method according to claim 1, wherein the internal memory is a Double Data Rate (DDR) Synchronous dynamic random access memory (SDRAM).

10. An apparatus for writing data into a Solid State Drive (SSD), comprising:
    a processor; and
    a memory, which stores processor-executable program code, wherein the processor is configured to execute the processor-executable program code to:
    configure, in the SSD, a low-level cell for storing open block data to form a low-level cell block;
    in response to receiving a data write instruction, write data into a high-level cell of the SSD, wherein the high-level cell has a unit capacity higher than a unit capacity of the low-level cell;
    in response to that an existing time of a block which is not full of data in the high-level cell exceeds an open block status threshold value, determine the block that is not full of data as an open block and storing the open block in a pending list; and
    in response to the existence of the open block in the pending list, transfer the open block to the low-level cell block through an internal memory, and close the open block in the low-level cell block and increase the open block status threshold value after transferring the open block to the low level cell block through the internal memory,
    wherein the low-level cell is a Single-Level Cell (SLC) or a Multi-Level Cell (MLC); the high-level cell is a Trinary-Level Cell (TLC) or a Quad-Level Cell (QLC); and a the data writing speed of the low-level cell is higher than that of the high-level cell.

11. The apparatus according to claim 10, wherein the low-level cell block comprises a master block and a standby block;

transferring the open block to the low-level cell block through an internal memory comprises: in response to that the master block is not full, transferring the open block to the master block through the internal memory; in response to that the master block is full, transferring the open block to the standby block through the internal memory; and in response to that the master block and the standby block are full, transferring the open block that has been closed in the master block or the standby block to the high-level cell.

12. The apparatus according to claim 11, the processor is further configured to:

transfer the open block that has been closed in the master block or in the standby block to the high-level cell in response to that the master block and the standby block are full.

13. The apparatus according to claim 10, the processor is further configured to:

adaptively update a mapping table recording data storage addresses after transferring the open block to the low-level cell block through the internal memory.

14. The apparatus according to claim 10, wherein the processor is further configured to:

generate and store a read retry table for the open block, or write invalid data into a part, which is not full of data, in the open block.

15. The apparatus according to claim 10, the internal memory is a Double Data Rate (DDR) Synchronous dynamic random access memory (SDRAM).

16. The apparatus according to claim 10, wherein the processor is further configured to:

set a timer to detect whether the existing time of the block which is not full of data exceeds the open block status threshold value.

17. The apparatus according to claim 16, wherein the existing time is a time difference value between a start of the block and a time point detected by the timer.

18. The apparatus according to claim 10, wherein the processor is further configured to:

increase a recycle level of the open block after transferring the open block to the low-level cell block through the internal memory.

* * * * *